US010449994B2

(12) United States Patent
Funahashi

(10) Patent No.: US 10,449,994 B2
(45) Date of Patent: Oct. 22, 2019

(54) STEERING APPARATUS

(71) Applicant: AISIN SEIKI KABUSHIKI KAISHA, Kariya-shi, Aichi-ken (JP)

(72) Inventor: Akitsugu Funahashi, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 86 days.

(21) Appl. No.: 15/864,476

(22) Filed: Jan. 8, 2018

(65) Prior Publication Data

US 2018/0201296 A1 Jul. 19, 2018

(30) Foreign Application Priority Data

Jan. 19, 2017 (JP) ................................ 2017-007866

(51) Int. Cl.

| | |
|---|---|
| ***B62D 1/189*** | (2006.01) |
| ***B62D 1/181*** | (2006.01) |
| ***B60R 16/02*** | (2006.01) |
| ***H02K 11/33*** | (2016.01) |

(52) U.S. Cl.
CPC .............. *B62D 1/189* (2013.01); *B60R 16/02* (2013.01); *B62D 1/181* (2013.01); *H02K 11/33* (2016.01)

(58) Field of Classification Search
CPC ........ B62D 1/189; B62D 1/181; H02K 11/33; B60R 16/02
See application file for complete search history.

(56) References Cited

U.S. PATENT DOCUMENTS

| | | | |
|---|---|---|---|
| 8,910,976 B2 | 12/2014 | Toyoda et al. | |
| 2003/0230942 A1* | 12/2003 | Okubo | H02K 11/01 310/89 |
| 2005/0167183 A1* | 8/2005 | Tominaga | B62D 5/0406 180/444 |
| 2005/0269895 A1* | 12/2005 | Innami | B62D 5/0403 310/429 |
| 2009/0120712 A1* | 5/2009 | Kashimoto | B62D 5/0406 180/444 |
| 2009/0183940 A1* | 7/2009 | Sekine | B62D 5/0406 180/443 |
| 2009/0272599 A1* | 11/2009 | Sekine | B62D 5/0406 180/443 |
| 2009/0295325 A1* | 12/2009 | Sekine | B62D 5/0406 318/646 |

(Continued)

FOREIGN PATENT DOCUMENTS

| | | |
|---|---|---|
| JP | 5-39205 Y2 | 10/1993 |
| JP | 2008-296854 A | 12/2008 |
| JP | 5796776 B2 | 10/2015 |

*Primary Examiner* — Drew J Brown
(74) *Attorney, Agent, or Firm* — Buchanan Ingersoll & Rooney PC

(57) ABSTRACT

A steering apparatus includes: a steering column that rotatably supports a steering shaft; and a controller provided with an accommodation case fixed to an outer peripheral surface of the steering column, in which a pair of engagement protrusions, which face each other, are provided on the outer peripheral surface of the steering column, an insertion portion is provided in the accommodation case to be inserted between the engagement protrusions, and the insertion portion is provided with a fitting portion having a crushing margin which is crushed by the engagement protrusions when the insertion portion is inserted between the engagement protrusions.

19 Claims, 15 Drawing Sheets

1
L
4
5
2 (2a)
N
3
33 (33a, S)
20 (30)

(56) References Cited

U.S. PATENT DOCUMENTS

| | | | | |
|---|---|---|---|---|
| 2012/0273292 | A1* | 11/2012 | Sekine | B62D 5/0406 180/444 |
| 2012/0312626 | A1* | 12/2012 | Hosomi | B62D 1/189 180/443 |
| 2013/0299269 | A1* | 11/2013 | Tsunoda | B62D 5/0406 180/444 |
| 2015/0334854 | A1* | 11/2015 | Ushio | H01R 13/5227 361/752 |

* cited by examiner

STEERING APPARATUS

CROSS REFERENCE TO RELATED APPLICATIONS

This application is based on and claims priority under 35 U.S.C. § 119 to Japanese Patent Application 2017-007866, filed on Jan. 19, 2017, the entire contents of which are incorporated herein by reference.

TECHNICAL FIELD

This disclosure relates to a steering apparatus.

BACKGROUND DISCUSSION

In the related art, a steering apparatus of a vehicle includes, for example, an actuator provided in a steering column as disclosed in JP Patent No. 5796776 (Reference 1). In general, a controller for controlling an operation of the actuator has a configuration in which a printed circuit board on which a control circuit is mounted is held inside an accommodation case formed of a resin. In addition, such an accommodation case is generally fixed to the steering column by using a mounting bracket as disclosed in, for example, JP 05-039205 U (Reference 2), or by a screw fixation using a bolt as disclosed in, for example, JP 2008-296854 A (Reference 3).

However, the steering apparatus of the vehicle requires a stable fixed-state that is capable of withstanding various stresses acting on the accommodation case after being mounted in the vehicle. Therefore, in the configuration in which an engagement piece of a holding bracket is inserted into a groove of a fitting portion provided in the accommodation case as in the related art, sufficient holding strength may not be secured. Further, in a case of using such a mounting bracket or in a case of directly fastening the accommodation case to the steering column, it is necessary to form a fastening portion for fastening a screw to the steering column. Thus, there is still room for improvement.

Thus, a need exists for a steering apparatus which is not susceptible to the drawback mentioned above.

SUMMARY

A steering apparatus according to an aspect of this disclosure includes a steering column that rotatably supports a steering shaft, and a controller provided with an accommodation case fixed to an outer peripheral surface of the steering column. A pair of engagement protrusions, which face each other, are provided on the outer peripheral surface of the steering column, an insertion portion is provided in the accommodation case to be inserted between the engagement protrusions, and the insertion portion is provided with a fitting portion having a crushing margin which is crushed by the engagement protrusions when the insertion portion is inserted between the engagement protrusions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a steering apparatus will be described with reference to the drawings.

Figure 1:
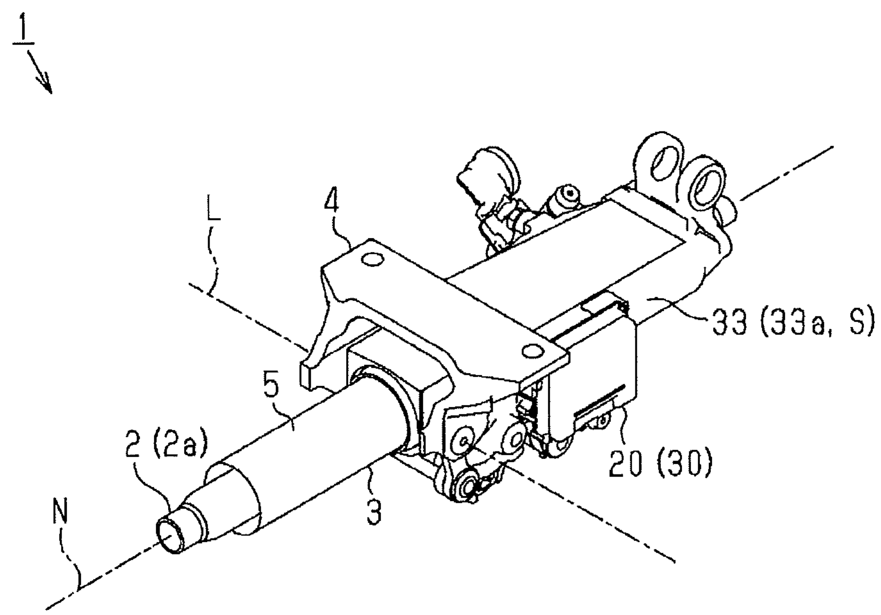
FIG. 1 is a perspective view of a steering apparatus.
Figure 2:
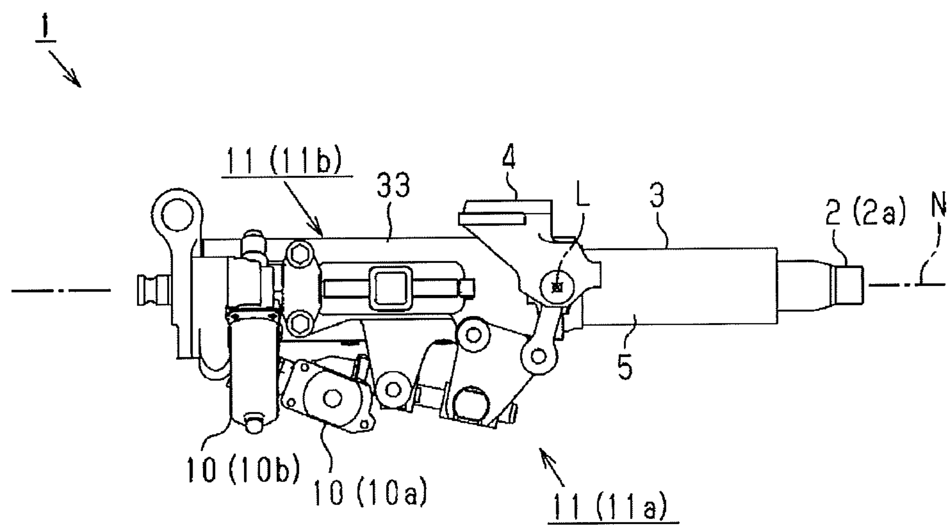
FIG. 2 is a side view of the steering apparatus.
Figure 3:
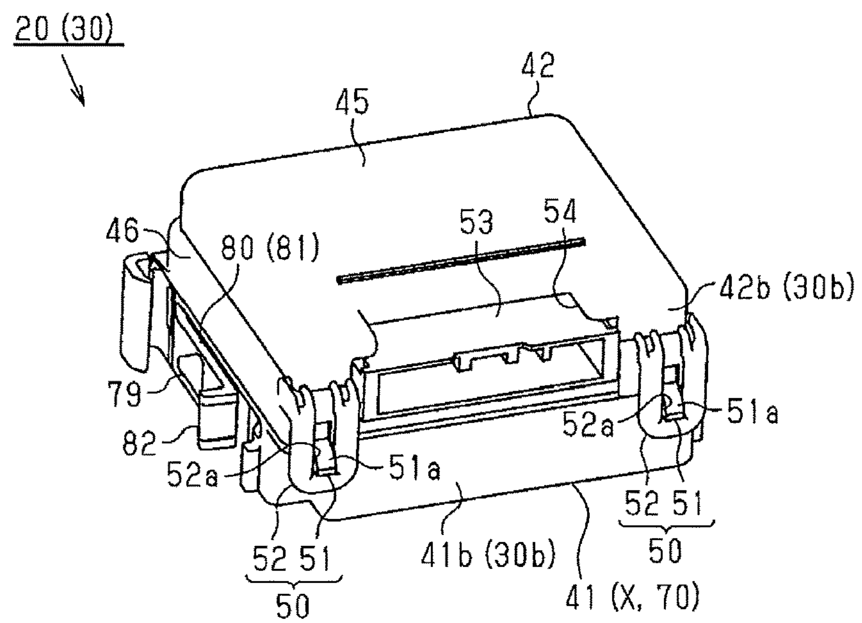
FIG. 3 is a perspective view of a controller provided in the steering apparatus.
Figure 4:
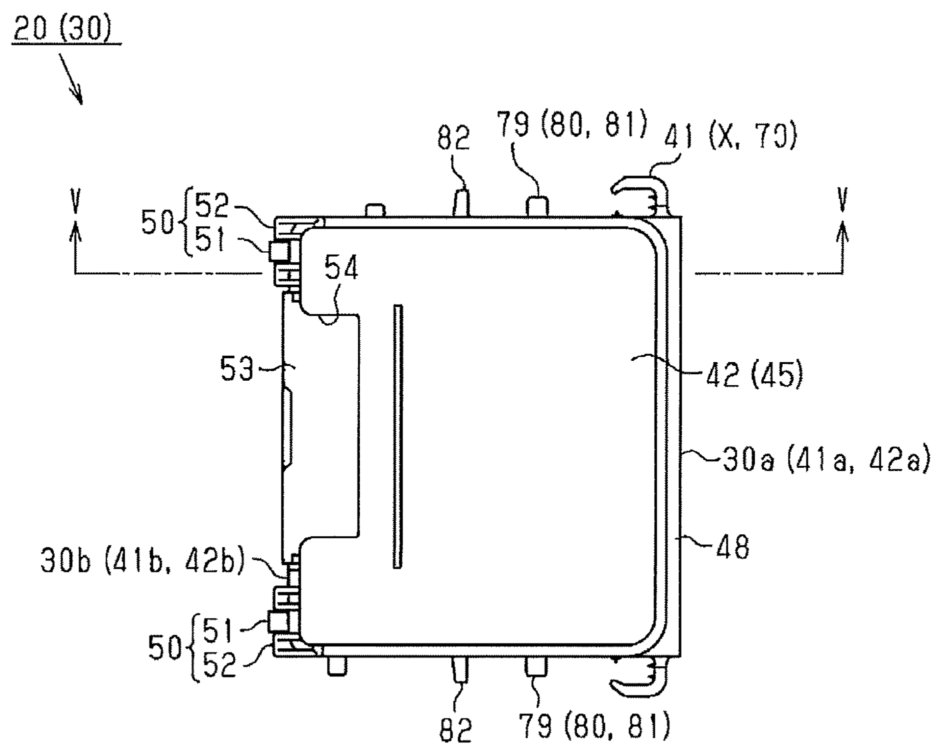
FIG. 4 is a plan view of the controller.

As illustrated in FIGS. 1 and 2, a steering apparatus 1 of a vehicle includes a steering shaft 2 to which a steering wheel (not illustrated) is mounted at a distal end 2*a* thereof, a steering column 3 that rotatably supports the steering shaft 2, and a fixing bracket 4 that fixes the steering column 3 to a vehicle body (not illustrated).

The steering column 3 of the embodiment disclosed here has a configuration known in the related art, in which the steering shaft (column shaft) 2 is accommodated inside a support tube 5 formed in a substantially cylindrical shape. Further, the fixing bracket 4 has a support shaft L extending in the horizontal direction perpendicular to the axis N of the steering shaft 2. In addition, the steering apparatus 1 of the present embodiment includes a tilt actuator 11*a* that tilts the steering column 3 about its support axis L (consequently, the steering shaft 2 supported by the steering column 3) using a motor 10 (10*a*) as a drive source.

Further, the steering shaft 2 of the present embodiment has a configuration extensible and rotation-transmissible configuration in which two shaft-shaped members are spline-fitted to each other. Furthermore, in the steering column 3 of the embodiment, a pair of support tubes 5 (an outer tube and an inner tube) are arranged concentrically so as to rotatably support the respective shaft-shaped members. The steering apparatus 1 of the embodiment includes a telescopic actuator 11*b* that causes the steering shaft 2 to expand and contract by relatively moving the two support tubes 5 in the axial direction, using the motor 10 (10*b*) as a drive source.

Furthermore, the steering apparatus 1 of the embodiment includes a controller 20 that controls the operation of the actuators 11 (11*a* and 11*b*). Specifically, the controller 20 controls the operation of the actuators 11*b* y supplying a drive power to the motors 10 (10*a* and 10*b*) of the respective actuators 11. In addition, in the steering apparatus 1 of the embodiment, a DC motor with a brush is adopted as each of the motors 10 (10*a* and 10*b*) of the actuators 11. Then, the controller 20 of the embodiment controls the operation of the tilt actuator 11*a* so as to change the vertical position of the steering wheel attached to the distal end 2*a* of the steering shaft 2 (tilt control), and controls the operation of the telescopic actuator 11*b* so as to change the front-rear position of the steering wheel (telescopic control).

More specifically, as illustrated in FIGS. 3 to 6, the controller 20 of the embodiment includes an accommodation case 30 having a substantially rectangular flat box shape and a printed circuit board 31 accommodated inside the accommodation case 30. That is, the printed circuit board 31 is mounted with a control circuit (not illustrated) for controlling the operation of the actuators 11 (11*a* and 11*b*) provided in the steering apparatus 1. Further, the accommodation case 30 of the embodiment is formed of a resin. As illustrated in FIG. 1, the controller 20 of the embodiment is assembled to the steering apparatus 1 in such a manner that the accommodation case 30 is fitted to a housing 33 of the steering column 3, which is formed of a metal such as, for example, an aluminum alloy.

As illustrated in FIGS. 5 to 8, the accommodation case 30 of the embodiment includes first and second case members 41 and 42 that are assembled with each other so as to form an accommodation chamber 35 of the printed circuit board 31. Specifically, in the accommodation case 30 of the embodiment, the first case member 41 includes a bottom plate portion 43 forming a bottom surface 41*s* in a substantially rectangular shape and a side wall portion 44 erected on the peripheral edge portion of the bottom plate portion 43 so as to surround the four sides of the bottom face 41*s*. In addition, the second case member 42 includes a top plate portion 45 having a substantially rectangular plate-like outer shape and a side wall portion 46 surrounding the peripheral portion of the top plate portion 45. Furthermore, the box shape of the second case member 42 formed by the top plate portion 45 and the side wall portion 46 has an external dimension slightly larger than that of the box shape of the first case member 41 formed by the bottom plate portion 43 and the side wall portion 44. The accommodation case 30 of the embodiment is configured such that the first and second case members 41 and 42 are assembled in such a manner that their box shapes are fitted to each other.

More specifically, the accommodation case 30 of the embodiment has a hinge portion 48 that has bendable flexibility and connects the first and second case members 41 and 42. In the accommodation case 30 of the embodiment, the hinge portion 48 is provided in a manner of connecting a side end portion 41*a* of the first case member 41 and a side end portion 42*a* of the second case member 42, which constitute a first side end portion 30*a* (see FIG. 4, the right side end portion in the figure) of the accommodation case 30. Specifically, in the accommodation case 30 of the embodiment, the first and second case members 41 and 42 are integrally molded with resin. At this time, the hinge portion 48 of the embodiment has a thin plate-like outer shape integrally formed with the first and second case members 41 and 42.

Figure 6:
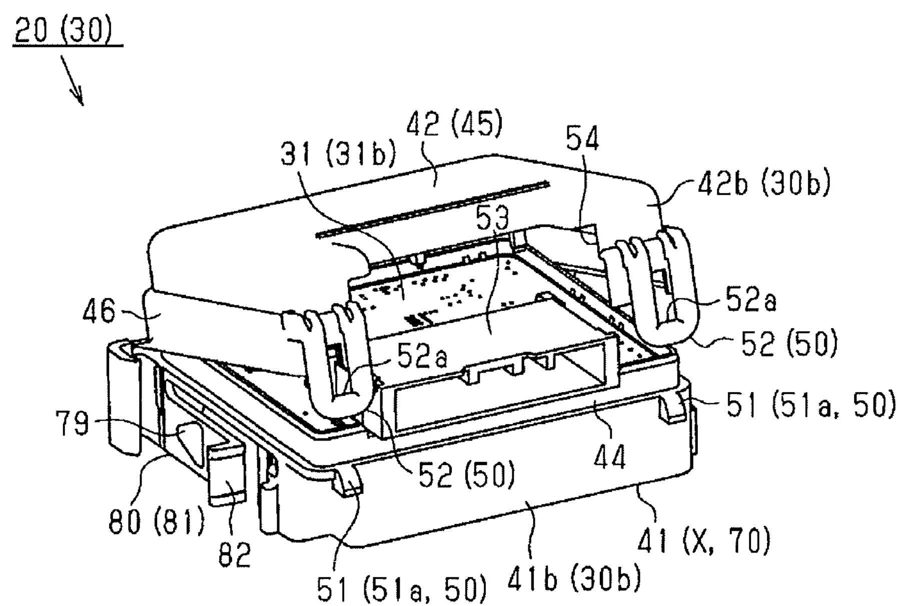
FIG. 6 is a perspective view of a printed circuit board and an accommodation case, which constitute the controller.
Figure 7:
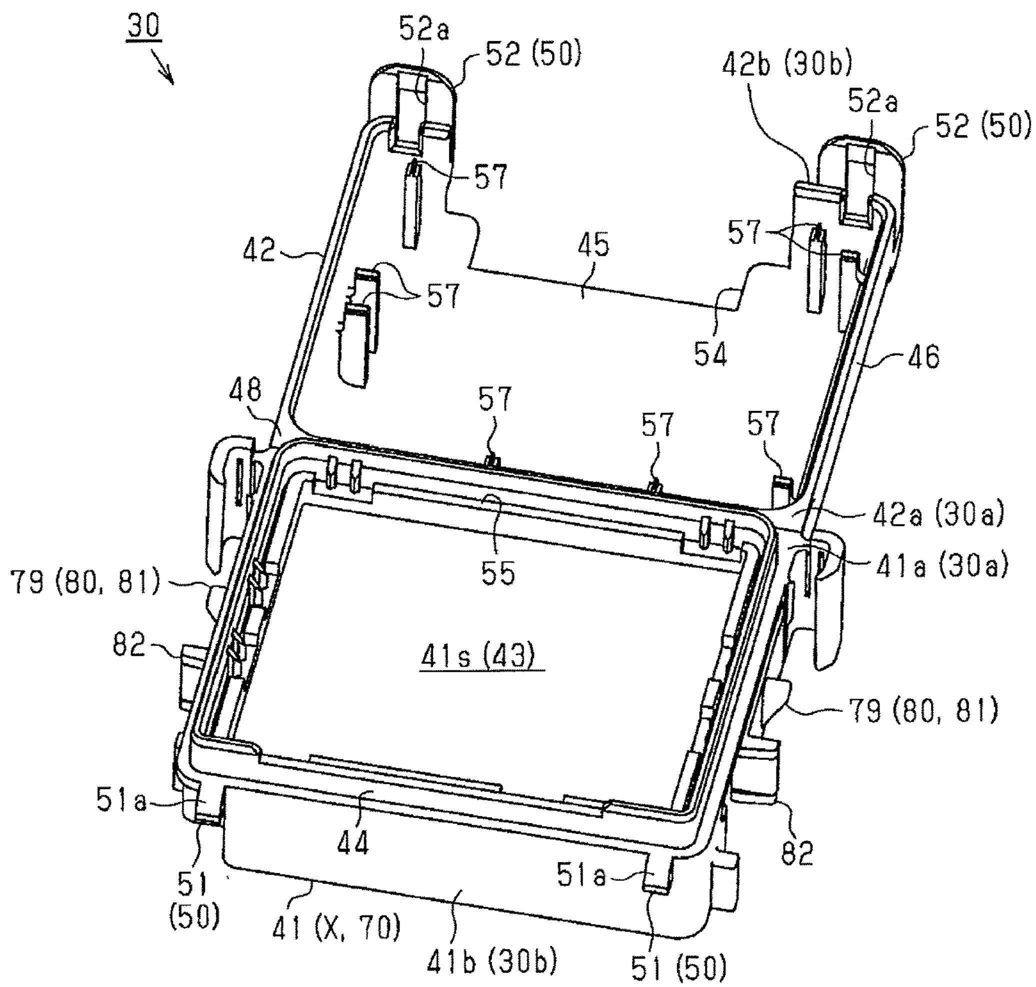
FIG. 7 is a perspective view of a first case member and a second case member, which constitutes the accommodation case.
Figure 8:
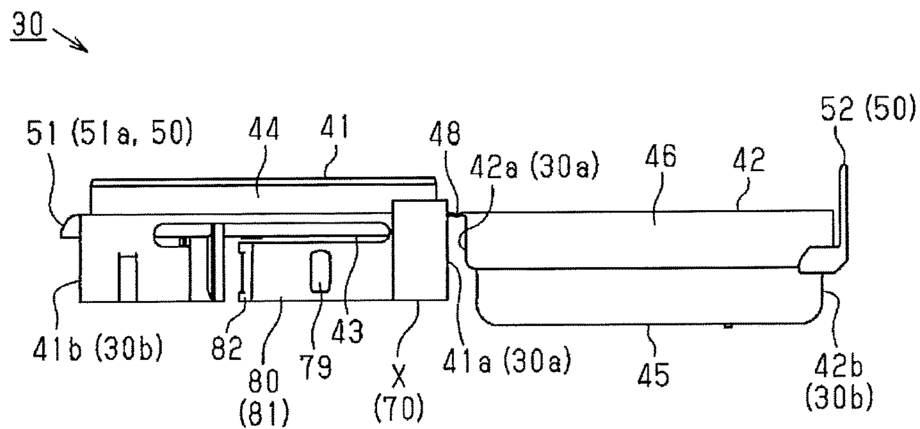
FIG. 8 is a side view of the first case member and the second case member.

That is, in the accommodation case 30 of the embodiment, the first and second case members 41 and 42 are pivoted relative to each other with the hinge portion 48 as a fulcrum by bending the hinge portion 48 along the respective side end portions 41*a* and 42*a* of the first and second case members 41 and 42 (see FIG. 6). As a result, the printed circuit board 31 is accommodated in the accommodation chamber 35 formed between the first and second case members 41 and 42 by fitting the box shapes to each other.

Further, as illustrated in FIGS. 3 to 8, in the accommodation case 30 of the embodiment, snap fits 50 for fixing the first and second case members 41 and 42 are provided in a second side end portion 30*b* opposite to the first side end portion 30*a* on which the hinge portion 48 is provided.

Specifically, engagement protrusions 51 are provided in a side end portion 41*b* of the first case member 41, which constitutes the second side end portion 30*b* (the left side end portion in FIG. 4) of the accommodation case 30. In the accommodation case 30 of the embodiment, the engagement protrusions 51 are formed in a substantially wedge shape having a slope 51*a* in a direction in which the box shape of the first case member 41 is opened (the upper side in FIG. 8). Similarly, engagement pieces 52, each having a hole 52*a* to be engaged with each of the engagement protrusions 51, are provided on the side end portion 42*b* of the second case member 42, which constitutes the second side end portion 30*b* of the accommodation case 30.

In addition, in the accommodation case 30 of the embodiment, a slit 54 is provided in a manner of cutting the side end portion 42*b* of the second case member 42 to pull out a connector portion 53 provided on the printed circuit board 31 to the outside of the accommodation case 30. In the second side end portion 30*b* of the accommodation case 30, an engagement protrusion 51 and an engagement piece 52, which constitute a snap fit 50, are provided on each of opposing sides in the width direction (the up-and-down direction in FIG. 4) of the slit 54.

That is, in the accommodation case 30 of the embodiment, the second case member 42 serving as a lid member pivots about the hinge portion 48 as a fulcrum so that the engagement pieces 52 provided on the second case member 42 side abut onto the slopes 51*a* of the engagement protrusions 51 provided on the first case member 41 side. Further, the engagement pieces 52 slide on the slopes 51*a* of the engagement protrusions 51 while being elastically deformed. Therefore, in the accommodation case 30 of the embodiment, the holes 52*a* of the engagement pieces 52 are fitted to the engagement protrusions 51, so that the first and second case members 41 and 42 are non-detachably fixed.

Figure 5:
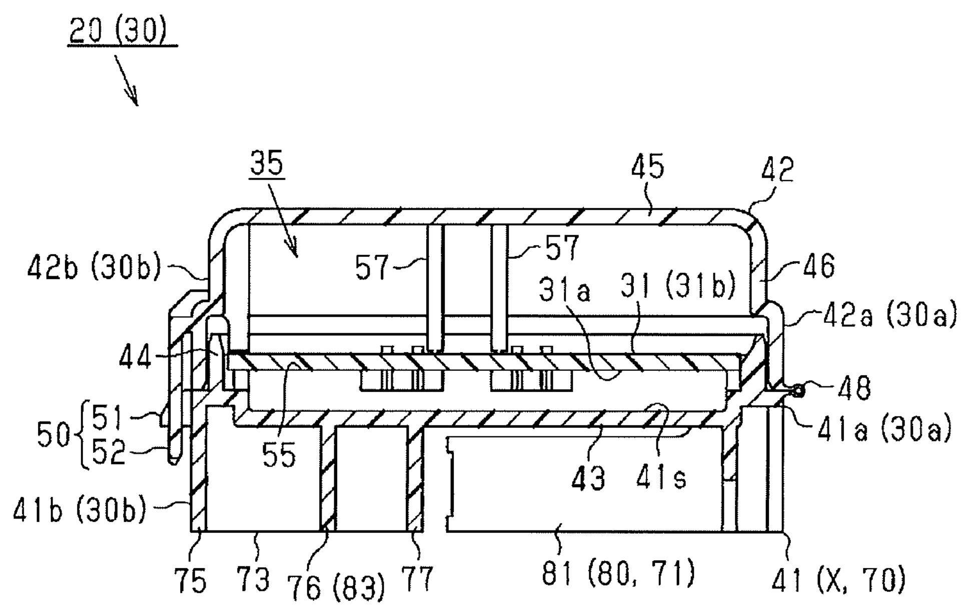
FIG. 5 is a cross-sectional view of the controller (V-V section in FIG. 4)

As illustrated in FIG. 5, the printed circuit board 31 of the embodiment is inserted into the box shape of the first case member 41, that is, the inside of the side wall portion 44 surrounding the four sides of the bottom surface 41*s* of the first case member 41 in a state where a rear surface 31*a* thereof faces the bottom surface 41*s*. Further, the first case member 41 of the embodiment is provided with a support surface 55 that abuts onto the rear surface 31*a* of the printed circuit board 31. The second case member 42 of the embodiment is provided with plural pressing portions 57 that abut onto the surface 31*b* of the printed circuit board 31 held by the first case member 41 in a state of being assembled to the first case member 41.

That is, in the accommodation case 30 of the embodiment, the second case member 42 serving as a lid member pivots about the hinge portion 48 as a fulcrum so that the pressing portions 57 abut onto the surface 31*b* which is a second flat surface portion of the printed circuit board 31. Then, the pressing portions 57 press the printed circuit board 31 against the support surface 55 of the first case member 41 so that the printed circuit board 31 is held in such a manner that the printed circuit board 31 is sandwiched between the first case member 41 and the second case member 42.

(Fixing Structure of Accommodation Case)

Next, descriptions will be made on the fixing structure of the accommodation case 30 in the steering apparatus 1 of the embodiment.

As illustrated in FIGS. 9 to 13, in the steering apparatus 1 of the embodiment, the housing 33, which constitutes an outer peripheral surface S of the steering column 3, has a semi-cylindrical shape having a substantially U-shaped cross-section. That is, the steering column 3 of the embodiment holds the steering shaft 2 and the support tube 5 inside the housing 33. In addition, a casting is used for the housing 33 of the embodiment. In the steering apparatus 1 of the embodiment, the accommodation case 30 is fitted to a side surface portion 33*a* of the housing 33, so that the controller 20 of each actuator 11 is integrally held with the steering column 3.

More specifically, as illustrated in FIGS. 10 to 13, the housing 33 of the embodiment has plural engagement protrusions 60 (61 to 66) protruding from the side surface portion 33*a* thereof. In the housing 33 of the embodiment, the engagement protrusions 60 are cast integrally with the housing 33. Further, the engagement protrusions 60 have a substantially flat plate-like outer shape protruding in a direction intersecting with the axial direction of the steering shaft 2 supported by the steering column 3, more specifically, in a direction along the support axis L of the steering column 3 extending in the horizontal direction perpendicular to the axis N of the steering shaft 2 (see FIGS. 1 and 2). The accommodation case 30 of the embodiment is configured to be fitted to the side surface portion 33*a* of the housing 33, that is, the outer peripheral surface S of the steering column 3 by being engaged with the engagement protrusions 60.

Specifically, the housing 33 of the embodiment has a pair of engagement protrusions 61 and 62 facing each other at two positions spaced apart from each other in the axial direction of the steering shaft 2. Similarly to the engagement protrusions 61 and 62, the housing 33 has a pair of engagement protrusions 63 and 64 facing each other at two positions spaced apart from each other in the axial direction of the steering shaft 2. In the housing 33 of the embodiment, the engagement protrusions 63 and 64 are provided at positions lower than the engagement protrusions 61 and 62 in the steering column 3 (the lower side in FIGS. 10 and 11). That is, the engagement protrusions 63 and 64 protrude from the outer peripheral surface S of the steering column 3 in a direction intersecting with the axial direction of the steering shaft 2 at a position deviated from the axis N of the steering shaft 2. The housing 33 of the embodiment has a pair of engagement protrusions 65 and 66 facing each other and extending in the axial direction of the steering shaft 2 at positions between the engagement protrusions 63 and 64.

Meanwhile, as illustrated in FIGS. 5, and 14 to 18, the accommodation case 30 of the embodiment has a pedestal portion X provided at a position which is the rear surface of the bottom surface 41*s* (the lower side in FIG. 5) formed by the bottom plate portion 43 of the first case member 41. In the accommodation case 30 of the embodiment, the pedestal portion X is constituted by plural wall portions 70 (71 to 77) substantially orthogonal to the bottom plate portion 43 of the first case member 41. The accommodation case 30 of the embodiment is configured such that the wall portions 70 are engaged with the engagement protrusions 60 provided on the side surface portion 33*a* of the housing 33 as described above.

Figure 10:
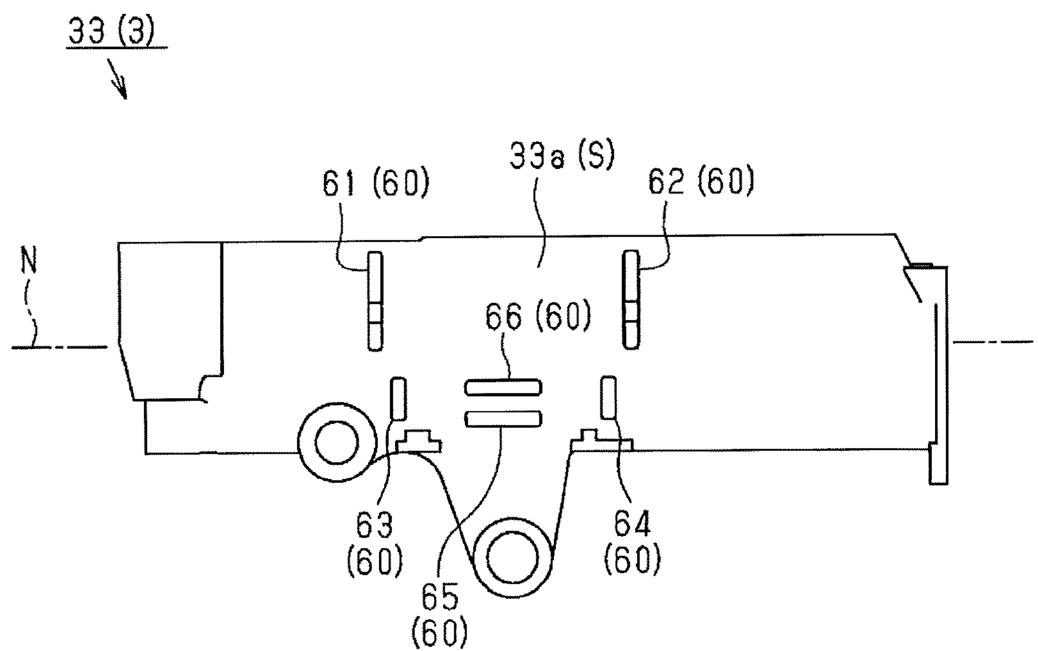
FIG. 10 is a side view of a housing, which constitutes the outer peripheral surface of the steering column.
Figure 11:
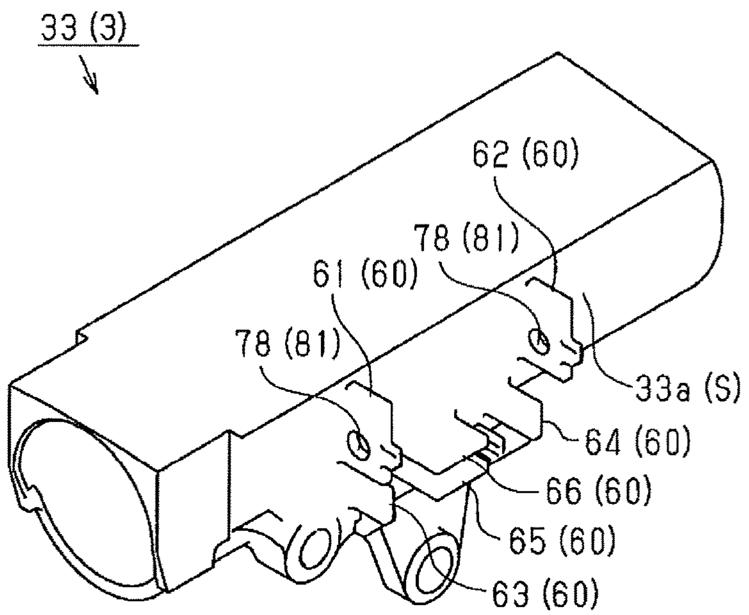
FIG. 11 is a perspective view of the housing.
Figure 12:
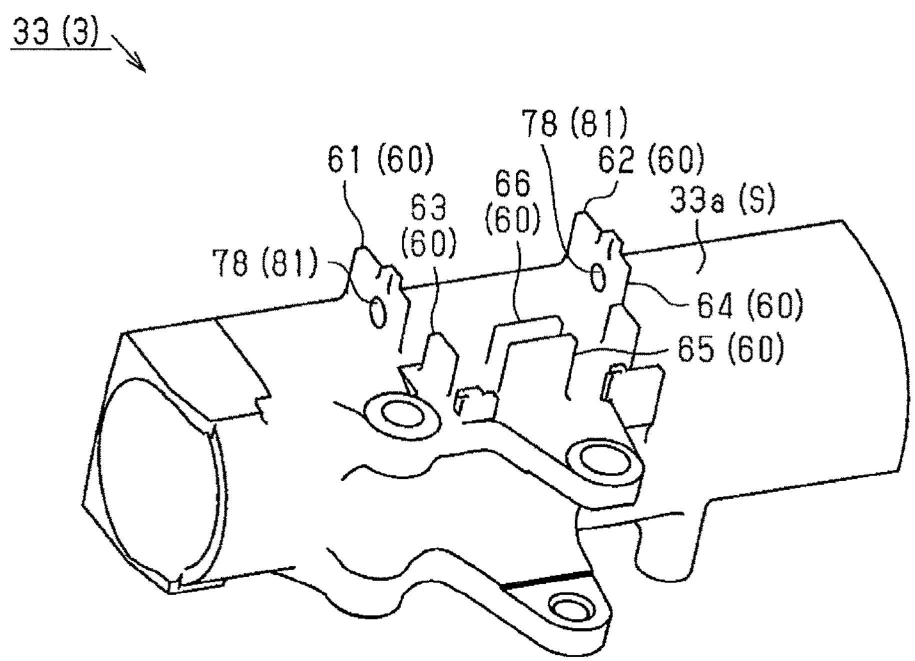
FIG. 12 is a perspective view of the housing.
Figure 13:
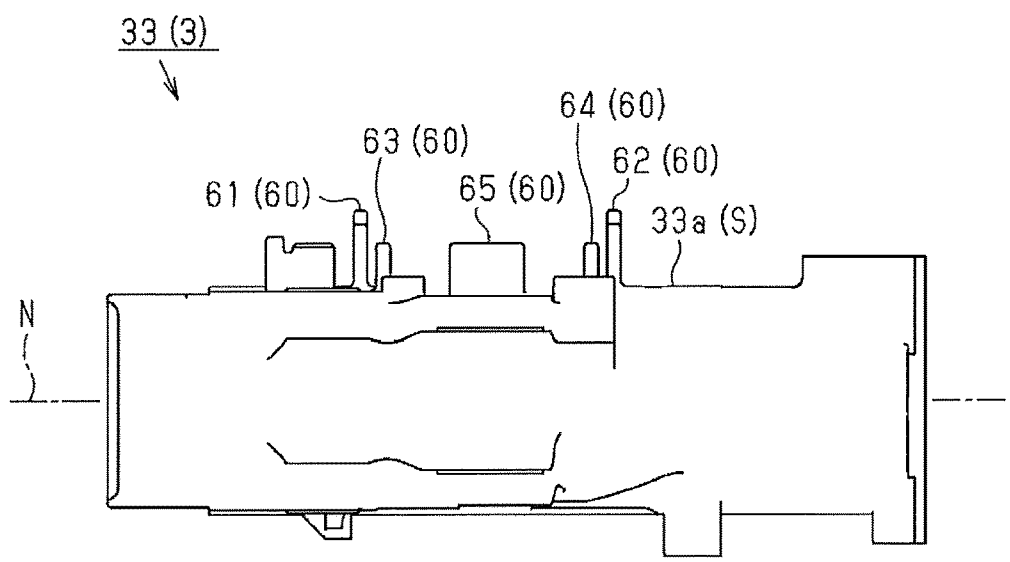
FIG. 13 is a bottom view of the housing.
Figure 14:
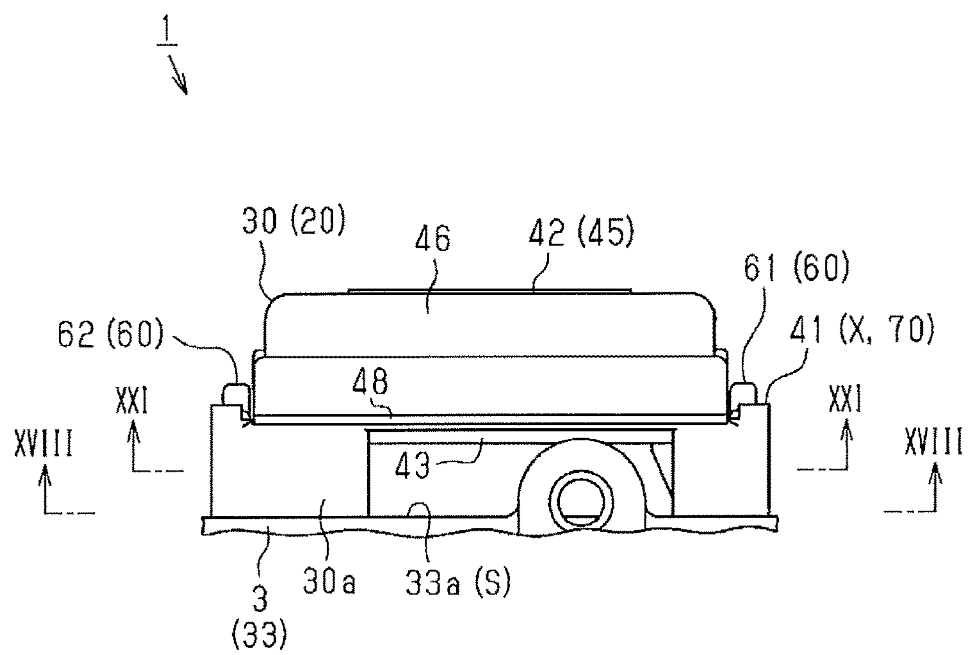
FIG. 14 is a side view of the accommodation case fixed to the outer peripheral surface of the steering column.
Figure 18:
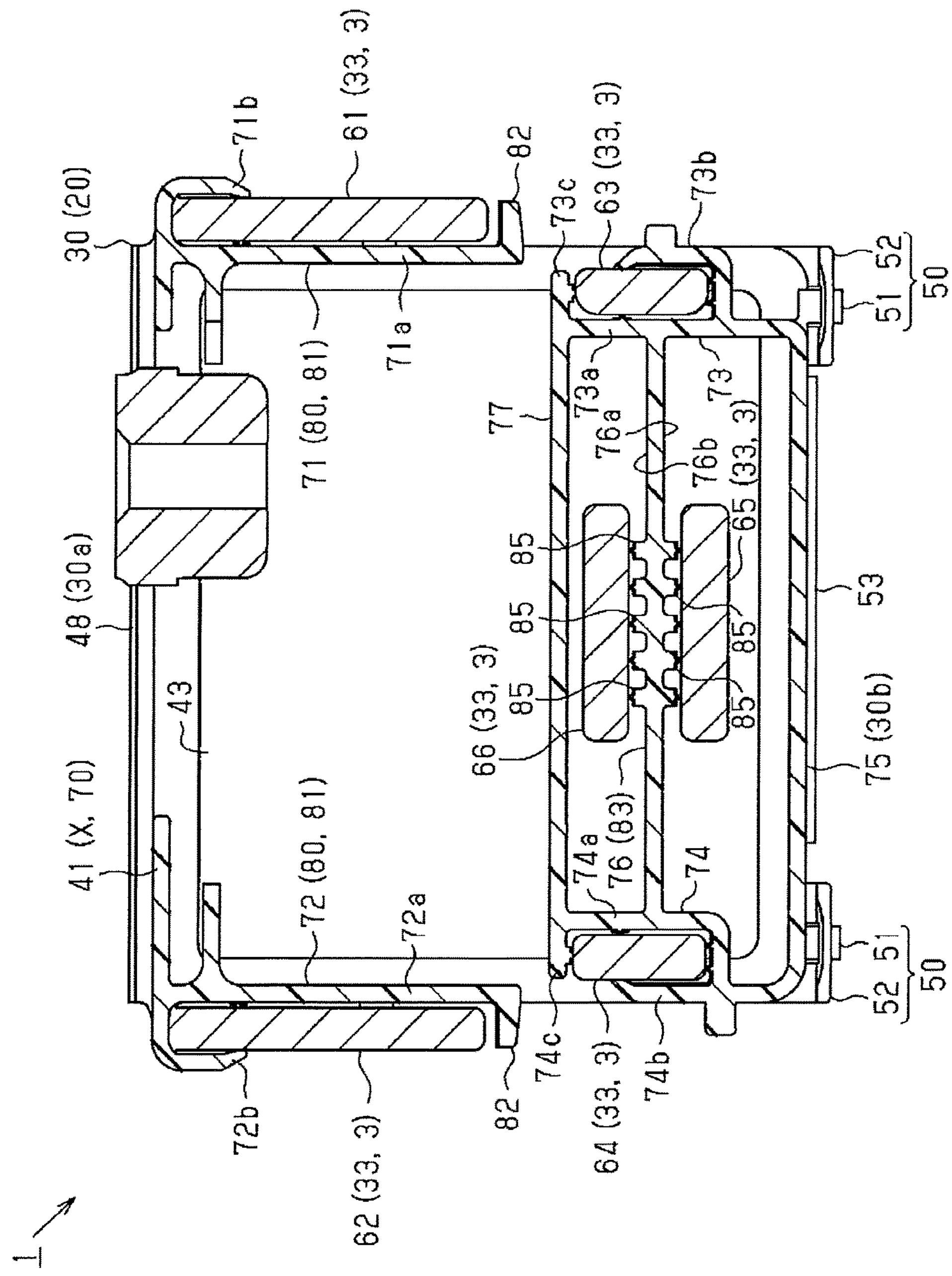
FIG. 18 is a cross-sectional view of the accommodation case fixed to the outer peripheral surface of the steering column (XVIII-XVIII section in FIG. 14)

Specifically, as illustrated in FIGS. 10 and 18, the pedestal portion X of the embodiment has wall portions 71 and 72 each of which is engaged with the engagement protrusion 61 or 62 protruding from the side surface portion 33*a* of the housing 33 in a state where each of the engagement protrusions 61 and 62 is sandwiched in the thickness direction thereof. Specifically, each of the wall portions 71 and 72 has a base wall portion 71*a* or 72*a* extending along one of the engagement protrusions 61 and 62 facing each other in the axial direction of the steering shaft 2, and a curved wall portion 71*b* or 72*b* having a substantially L-shaped cross-section that is provided at the end portion of the accommodation case 30 on the first side end portion 30*a* side in the longitudinal direction of the wall portion 71*a* or 72*a*. Each of the wall portions 71 and 72 of the embodiment is configured such that each of the engagement protrusions 61 and 62, which constitute the pedestal portion X of the accommodation case 30, is sandwiched between the base wall portion 71*a* or 72*a* and the curved wall 71*b* or 72*b*.

Further, the pedestal portion X of the embodiment also has wall portions 73 and 74 each of which is engaged with the engagement protrusion 63 or 64 protruding from the side surface portion 33*a* of the housing 33 in a state of surrounding the outer periphery thereof. Specifically, each of the wall portions 73 and 74 also has a base wall portion 73*a* or 74*a* extending along each of the engagement protrusions 63 and 64 facing each other in the axial direction of the steering shaft 2, and a curved wall portion 73*b* or 74*b* having a substantially L-shaped cross-section that is provided at the end portion of the accommodation case 30 on the first side end portion 30*a* side in the longitudinal direction of the wall portion 73*a* or 74*a*. Further, each of the wall portions 73 and 74 has a clamping wall 73*c* or 74*c* facing the base end portion of the curved wall 73*b* or 74*b* extending orthogonally to the base wall portion 73*a* or 74*a* at the end portion of the accommodation case 30 on the first side end portion 30*a* side in the longitudinal direction of the base wall portion 73*a* and 74*a*. Each of the wall portions 73 and 74 of the embodiment is configured such that each of the engagement protrusions 63 and 64, which constitute the pedestal portion X of the accommodation case 30, is sandwiched between the base wall portion 73*a* or 74*a* and the curved wall 73*b* or 74*b* and between the base end portion of the curved wall 73*b* or 74*b* and the clamping portions 73*c* and 74*c*.

Furthermore, the pedestal portion X of the embodiment includes a wall portion 75 extending along the second side end portion 30*b* of the accommodation case 30, and wall portions 76 and 77 provided substantially parallel to the wall portion 75. Further, in the embodiment, both longitudinal end portions of the wall portion 77 constitute the clamping walls 73*c* and 74*c* of the wall portions 73 and 74, respectively. The pedestal portion X of the embodiment is configured such that the wall portion 76 positioned between the wall portion 77 and the wall portion 75 is engaged with the engagement protrusions 65 and 66 protruding from the side surface portion 33*a* of the housing 33 in a state of being inserted between the engagement protrusions 65 and 66.

Figure 19:
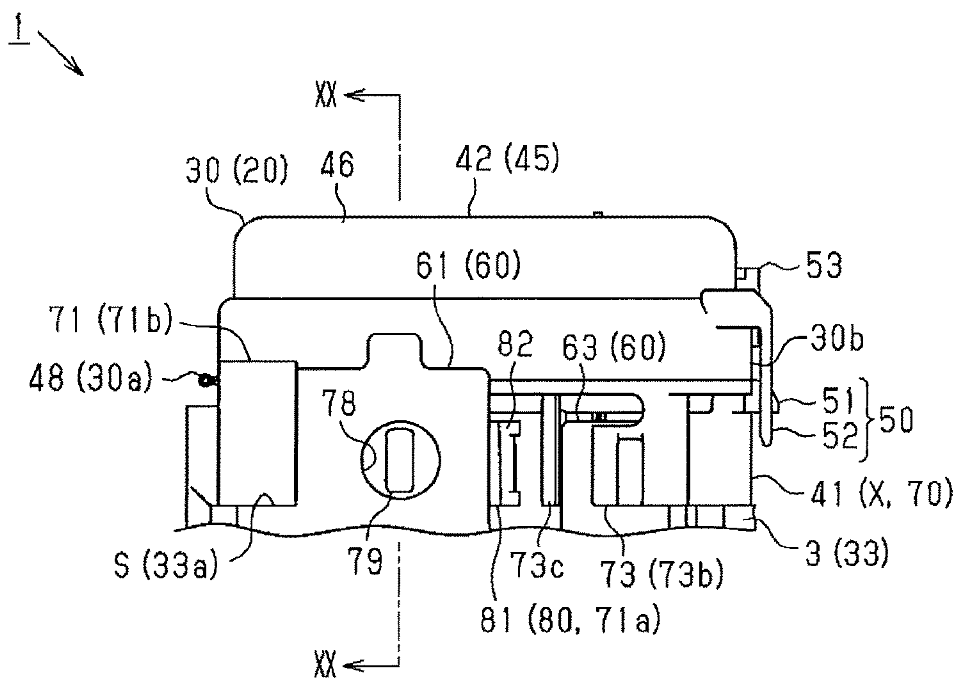
FIG. 19 is a side view of the accommodation case fixed to the outer peripheral surface of the steering column.
Figure 20:
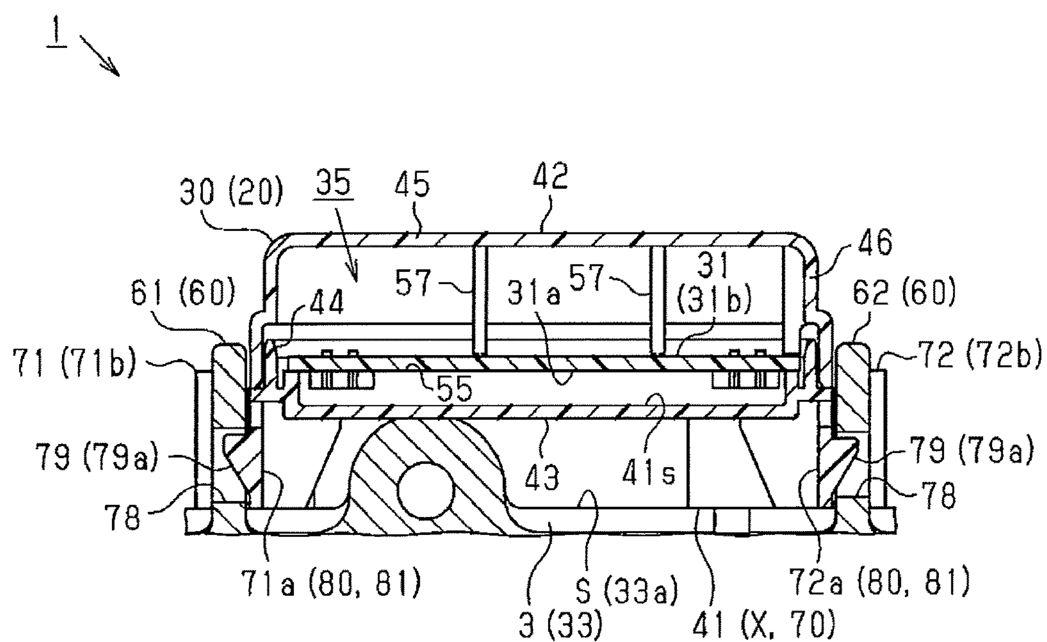
FIG. 20 is a cross-sectional view of the accommodation case fixed to the outer peripheral surface of the steering column (XX-XX section in FIG. 19)
Figure 21:
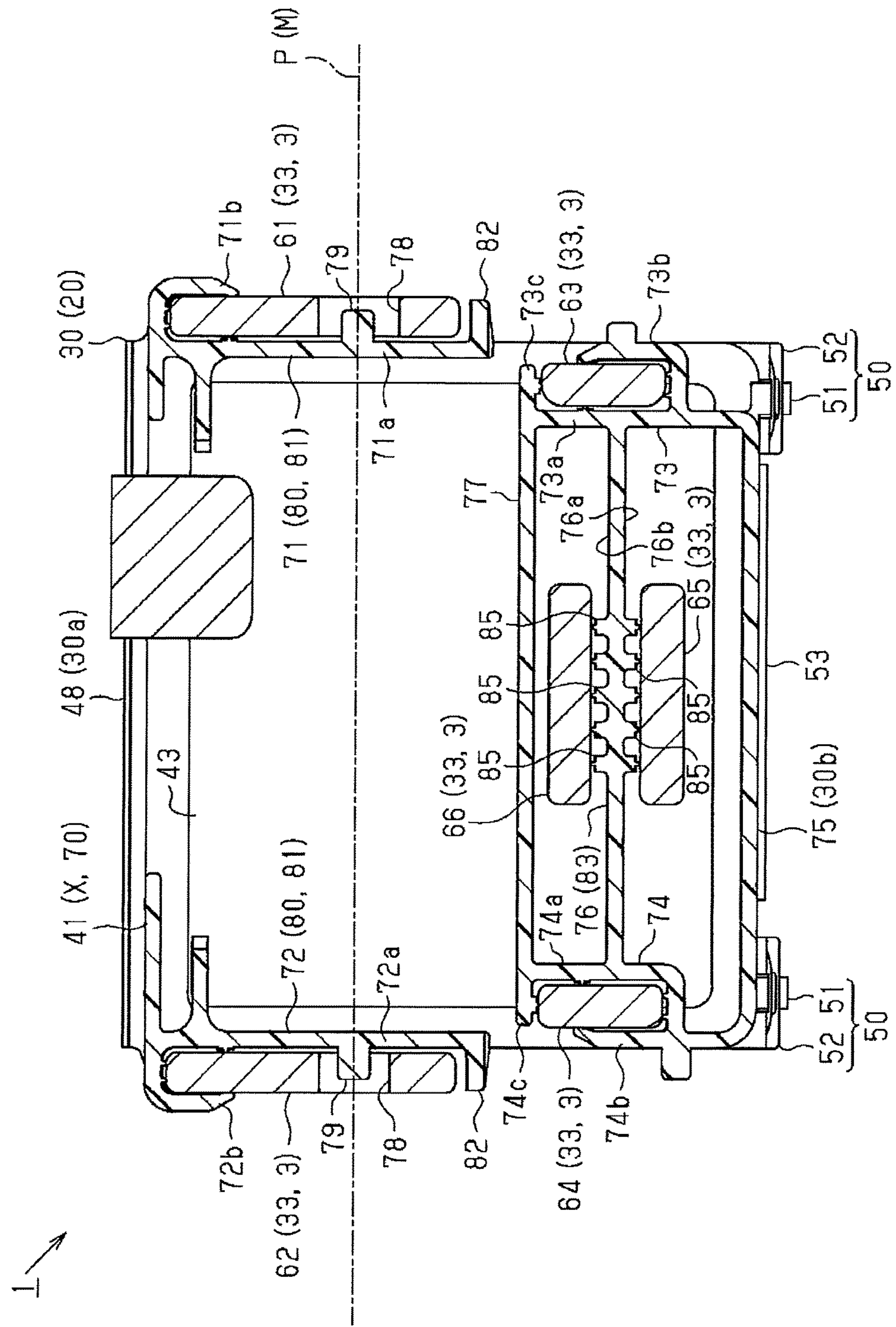
FIG. 21 is a cross-sectional view of the accommodation case fixed to the outer peripheral surface of the steering column (XXI-XXI section in FIG. 14)

More specifically, as illustrated in FIGS. 19 to 21, in the housing 33 of the embodiment, each of the engagement protrusions 61 and 62 is provided with a hole 78 penetrating each of the engagement protrusions 61 and 62 in the thickness direction. In the accommodation case 30 of the embodiment, each of the wall portions 71 and 72, which constitute the pedestal portion X, is provided with an engagement protrusion 79 to be inserted into the hole 78.

Specifically, the engagement protrusion 79 of the embodiment has a substantially wedge shape having a slope 79*a* on the side surface portion 33*a* side (the lower side in FIG. 20) of the housing 33, which constitutes the outer peripheral surface S of the steering column 3 in a state where the wall portions 71 and 72 are engaged with the engagement protrusions 61 and 62 on the housing 33 side. Further, the wall portions 71 and 72 on which the engagement protrusions 79 are provided have flexibility such that the base wall portions 71*a* and 72*a* facing each other are displaceable in the axial direction of the steering shaft 2, that is, in the direction intersecting with the extending direction of the engagement protrusions 61 and 62. In the steering apparatus 1 of the embodiment, the base wall portions 71*a* and 72*a* function as engagement pieces 80, thereby forming a snap fit 81 to fix the pedestal portion X of the accommodation case 30 to the outer peripheral surface S of the steering column 3.

That is, the accommodation case 30 of the embodiment is assembled to the side surface portion 33*a* of the housing 33, which constitutes the outer peripheral surface S of the steering column 3, from the direction in which the engagement protrusions 60 (61 to 66) protrude from the side surface portion 33*a* of the housing 33, that is, from the direction intersecting with the axial direction of the steering shaft 2. Therefore, the wall portions 71 and 72, which constitute the pedestal portion X of the accommodation case 30, are engaged with the engagement protrusions 61 and 62 on the housing 33 side, and the wall portions 73 and 74 on the accommodation case 30 side are engaged with the engagement protrusions 63 and 64 on the housing 33 side. Further, the wall portion 76 on the accommodation case 30 side is inserted between the engagement protrusions 65 and 66 on the housing 33 side. The accommodation case 30 of the embodiment is configured to be non-detachably fitted to the outer peripheral surface S of the steering column 3 by the snap fit 81 formed when the engagement protrusions 79 provided on the engagement pieces 80 are engaged with the holes 78 provided in the engagement protrusions 61 and 62 on the housing 33 side.

In the steering apparatus 1 of the embodiment, each hole 78 on the housing 33 side is provided in each of the engagement protrusions 61 and 62 at a position where the engagement protrusions 61 and 62 face each other in the axial direction of the steering shaft 2. Therefore, in the steering apparatus 1 of the embodiment, a pair of snap fits 81 aligned in the axial direction of the steering shaft 2 is formed.

Furthermore, in the accommodation case 30 of the embodiment, the base wall portions 71*a* and 72*a* of the wall portions 71 and 72 are provided with pressing protrusions 82 protruding in a direction away from each other at the end portion on the second side end portion 30*b* side of the accommodation case 30. That is, the base wall portion 71*a* or 72*a* of each of the wall portions 71 and 72, which constitute the engagement pieces 80 of the embodiment, is bent in the axial direction of the steering shaft 2 by pressing each pressing protrusion 82 provided at one end in the longitudinal direction thereof so as to sandwich the pressing protrusion 82. Therefore, the accommodation case 30 of the embodiment may be removed from the side surface portion 33*a* of the housing 33, that is, the outer peripheral surface S of the steering column 3 by detaching the engagement protrusions 79 provided on the respective engagement pieces 80 from the respective holes 78 provided in the respective engagement protrusions 61 and 62 on the housing 33 side.

Further, as illustrated in FIGS. 15 to 18 and 22, in the accommodation case 30 of the embodiment, plural fitting portions 85 are provided on the wall portion 76 as the insertion portion 83 to be inserted between the respective engagement protrusions 65 and 66 provided on the side surface portion 33*a* of the housing 33, among the wall portions 70, which constitute the pedestal portion X.

Figure 22:
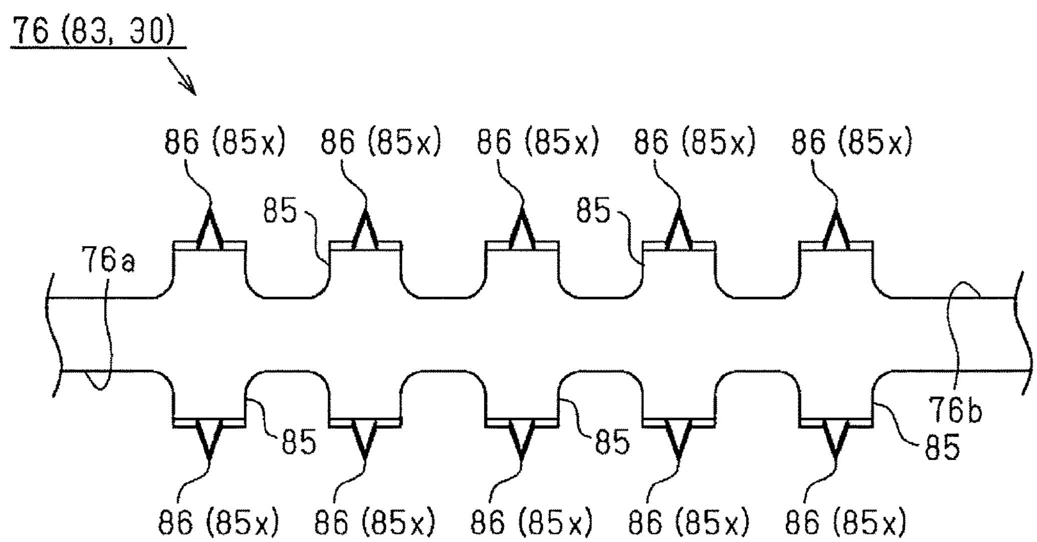
FIG. 22 is a plan view illustrating a fitting portion provided in an insertion portion on the accommodation case side.

More specifically, as illustrated in FIGS. 21 and 22, the wall portion 76 of the embodiment is provided with plural (five in the embodiment) fitting portions 85 aligned in the extending direction (the left-right direction in FIGS. 21 and 22) of the engagement protrusions 65 and 66 extending in the axial direction of the steering shaft 2, in a state where the wall portion 76 is inserted between the engagement protrusions 65 and 66 on the housing 33 side. In the wall portion 76 of the embodiment, each of the fitting portions 85 has a plate shape extending substantially orthogonal to the wall portion 76 in a manner of protruding from the wall surfaces 76*a* and 76*b* of the wall portion 76. That is, in the state where the wall portion 76 is inserted between the engagement protrusions 65 and 66 on the housing 33 side (see FIGS. 12 and 15), the fitting portions 85 extend in a direction in which the engagement protrusions 65 and 66 protrude from the side surface portion 33*a* of the housing 33, that is, from the outer peripheral surface S of the steering column 3. Each of the fitting portions 85 of the embodiment has a crushing margin 85*x* which is crushed by both of the engagement protrusions 65 and 66 by being inserted between the engagement protrusions 65 and 66 of the housing 33 side together with the wall portion 76, which constitutes the insertion portion 83 of the accommodation case 30 side.

Figure 23:
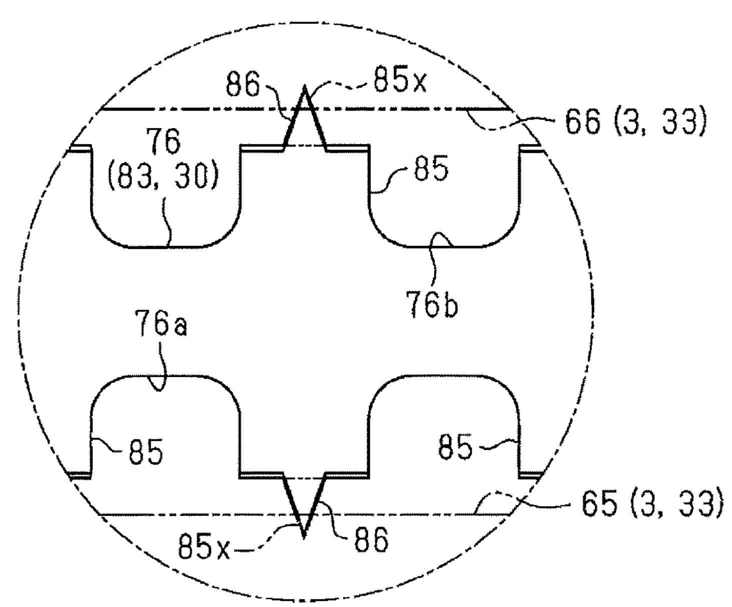
FIG. 23 is an enlarged view of the fitting portion provided in the insertion portion on the accommodation case side.

Specifically, as illustrated in FIGS. 22 and 23, each of the fitting portions 85 of the embodiment has a triangular prism portion 86 having a substantially triangular cross-section which tapers toward the protruding direction at the distal portion protruding from the wall surfaces 76*a* and 76*b* of the wall portion 76. In the accommodation case 30 of the embodiment, the crushing margin 85*x* of each fitting portion 85 is set in the triangular prism portion 86.

Figure 24:
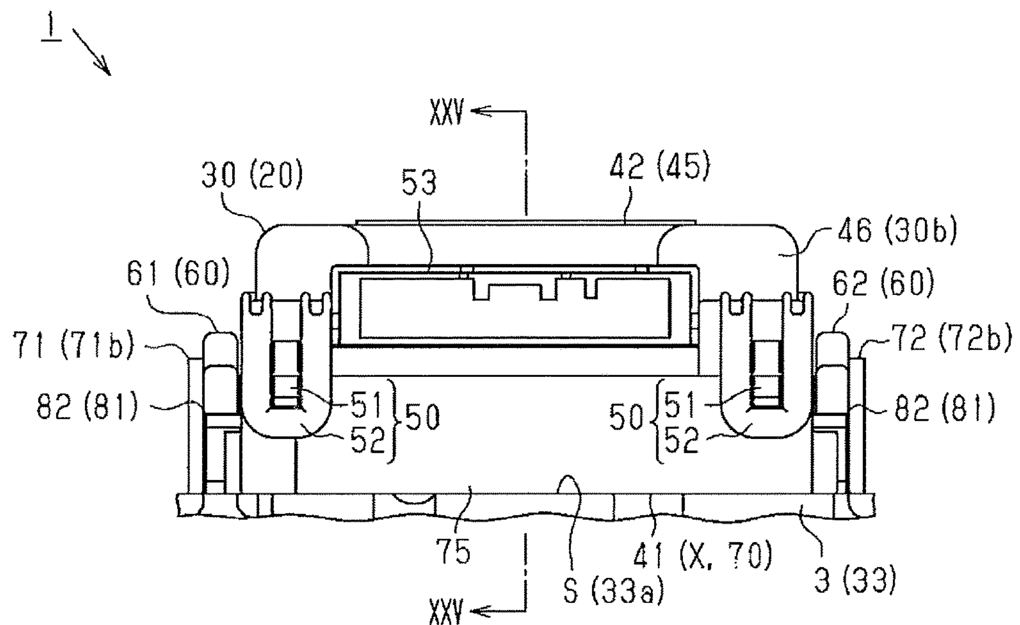
FIG. 24 is a side view of the accommodation case fixed to the outer peripheral surface of the steering column.
Figure 25:
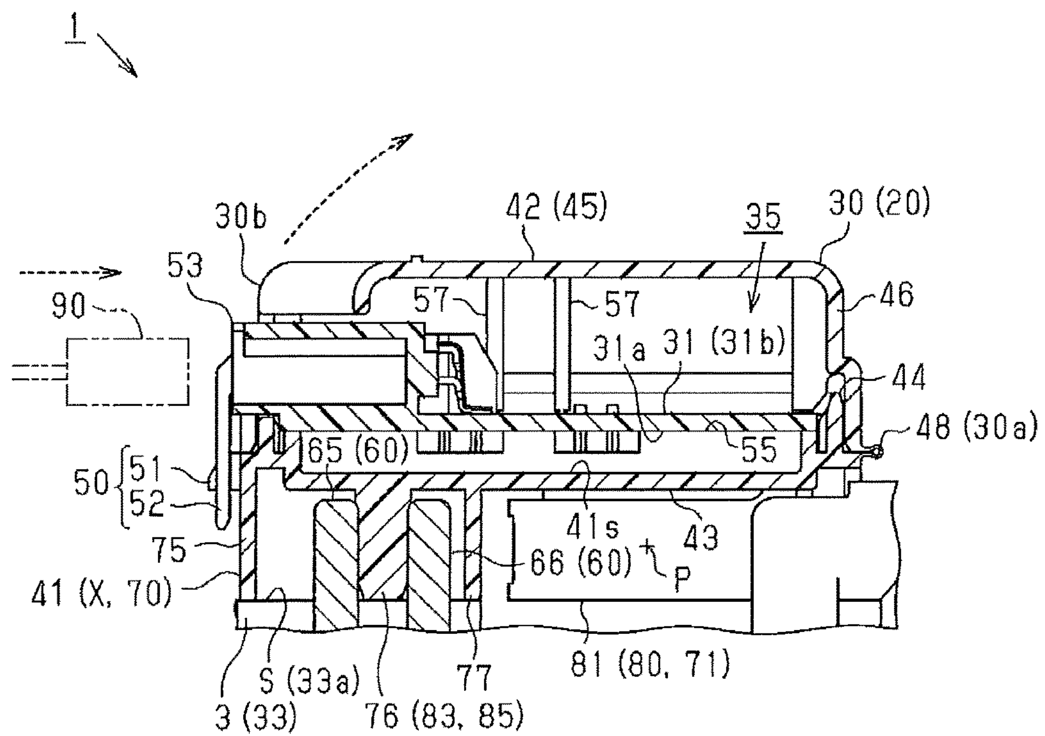
FIG. 25 is a cross-sectional view of the accommodation case fixed to the outer peripheral surface of the steering column (XXV-XXV section in FIG. 24).

That is, as illustrated in FIGS. 24 and 25, in the accommodation case 30 of the embodiment, when the wall portion 76 serving as the insertion portion 83 is inserted between the engagement protrusions 65 and 66 on the housing 33 side, the crushing margin 85*x* of each fitting portion 85 provided on the wall portion 76 is crushed by the engagement protrusions 65 and 66. Thus, the fitting portions 85 and the engagement protrusions 65 and 66 are brought into close contact with each other. Therefore, the steering apparatus 1 of the embodiment suppresses the displacement of the accommodation case 30 in the direction in which the engagement protrusions 65 and 66 face each other, and at the same time, suppresses the movement of the accommodation case 30 which may cause the wall portion 76 serving as the insertion portion 83 to be pulled out from the space between the engagement protrusions 65 and 66.

Figure 9:
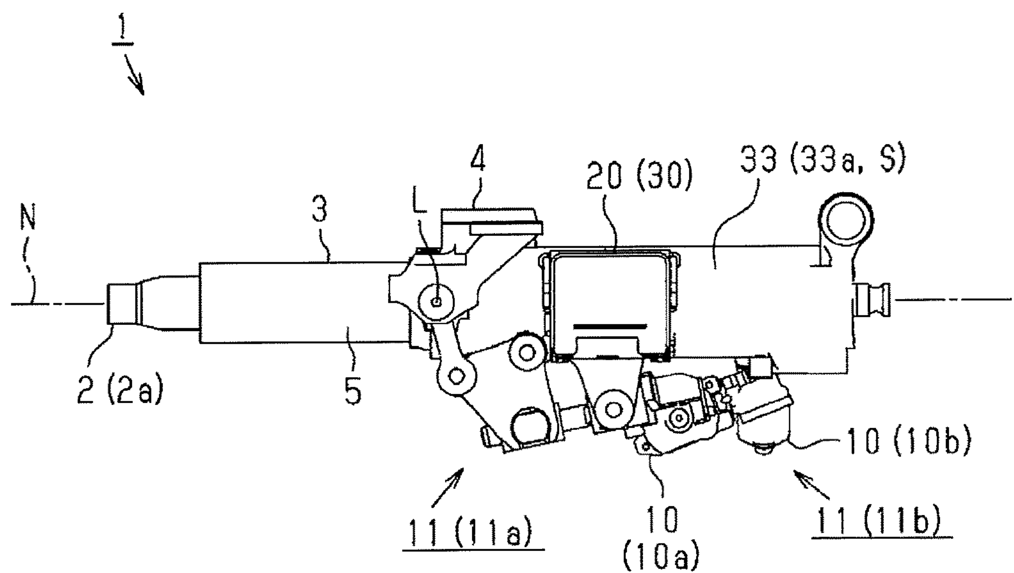
FIG. 9 is a side view of the steering apparatus illustrating the accommodation case fixed to an outer peripheral surface of a steering column.

Specifically, in the steering apparatus 1 of the embodiment, a wire harness 90 is connected to the connector portion 53 protruding from the accommodation case 30 in a state where the accommodation case 30 is fixed to the outer peripheral surface S of the steering column 3 (see FIGS. 1 and 9). More specifically, in the controller 20 of the present embodiment, the connector portion 53 faces the lower side of the steering column 3 (see FIG. 9, the lower side in the figure) in a state where the accommodation case 30 is fixed to the outer peripheral surface S of the steering column 3. That is, the wire harness 90 is connected to the connector portion 53 from the direction (twist direction) not intersecting with the side surface portion 33*a* of the housing 33, which constitutes the outer peripheral surface S of the steering column 3 to which the accommodation case 30 is fixed. As a result, a force for separating the accommodation case 30 from the outer peripheral surface S of the steering column 3 is applied to the accommodation case 30 while accompanying the pivoting (tilting) of the accommodation case 30.

More specifically, in the steering apparatus 1 of the embodiment, the respective engagement protrusions 79 provided on the respective engagement pieces 80 on the accommodation case 30 side are engaged with the respective holes 78 provided in the engagement protrusions 61 and 62 on the housing 33 side, which face each other in the axial direction of the steering shaft 2, thereby forming a pair of snap fits 81 aligned in the axial direction of the steering shaft 2. Therefore, when the wire harness 90 is connected to the connector portion 53, a pivot fulcrum P of the accommodation case 30 is likely to be formed in a manner of connecting the snap fits 81 (see FIG. 21, straight line M).

In view of this point, in the steering apparatus 1 of the embodiment, the engagement protrusions 65 and 66 on the housing 33 side, into which the wall portion 76, which constitutes the insertion portion 83 on the accommodation case 30 side, is inserted, face each other and extend in the axial direction of the steering shaft 2 (see FIG. 10, left and right direction in the figure). That is, the engagement protrusions 65 and 66 are provided so as to face each other in the direction intersecting with the direction connecting both of the snap fits 81 (see FIG. 21, vertical direction in the figure). In the steering apparatus 1 of the embodiment, since the fitting portion 85 in a state where the crushing margin 85*x* is crushed is brought into close contact with the engagement protrusions 65 and 66, it is possible to counteract the force for separating the accommodation case 30 from the outer peripheral surface S of the steering column 3 while accompanying the pivoting of the accommodation case 30 at the time of connecting the connector as described above.

Figure 15:
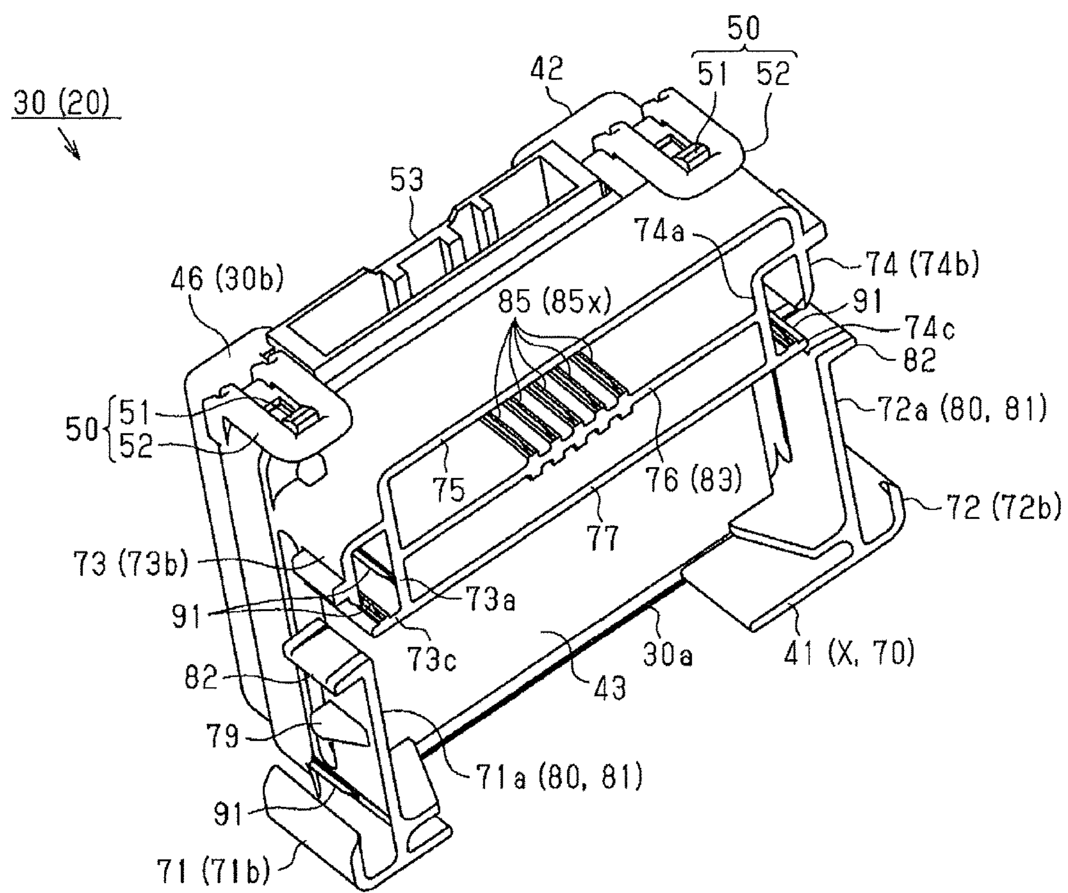
FIG. 15 is a perspective view of the accommodation case.
Figure 16:
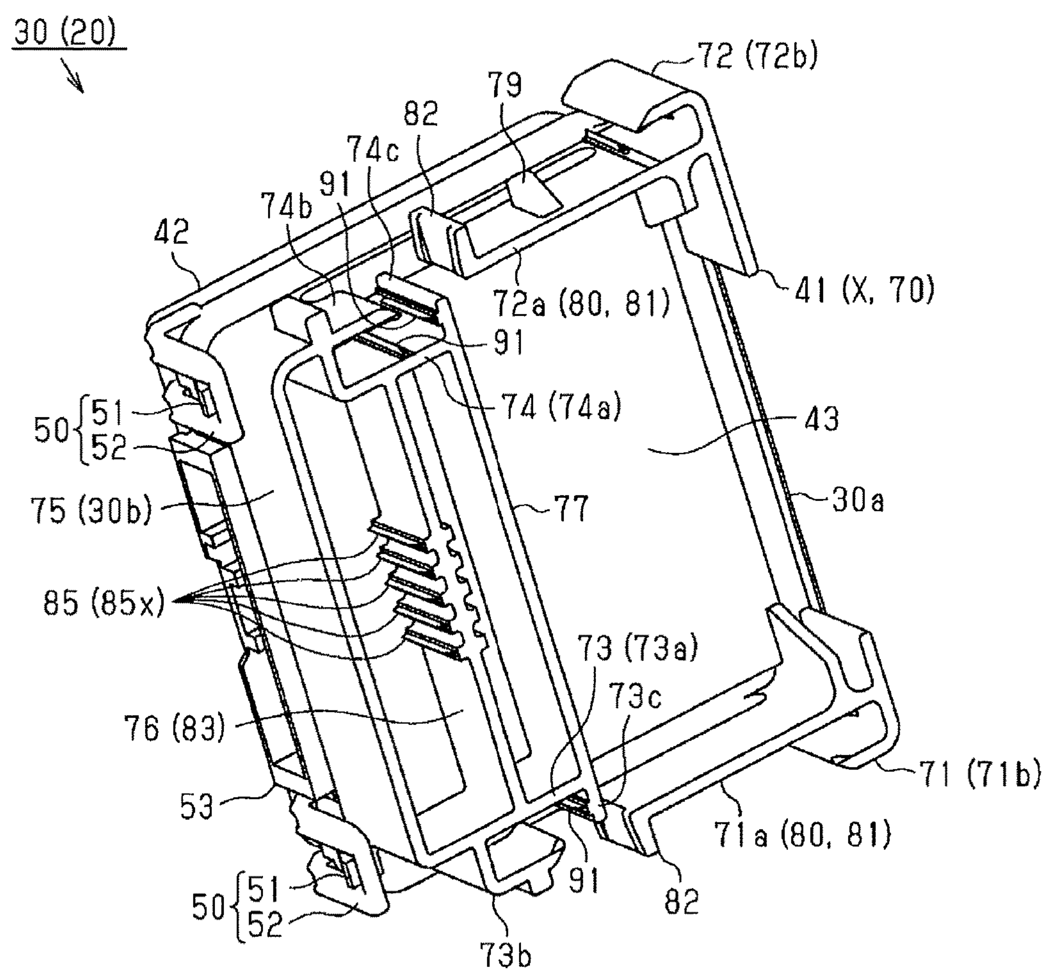
FIG. 16 is a perspective view of the accommodation case.
Figure 17:
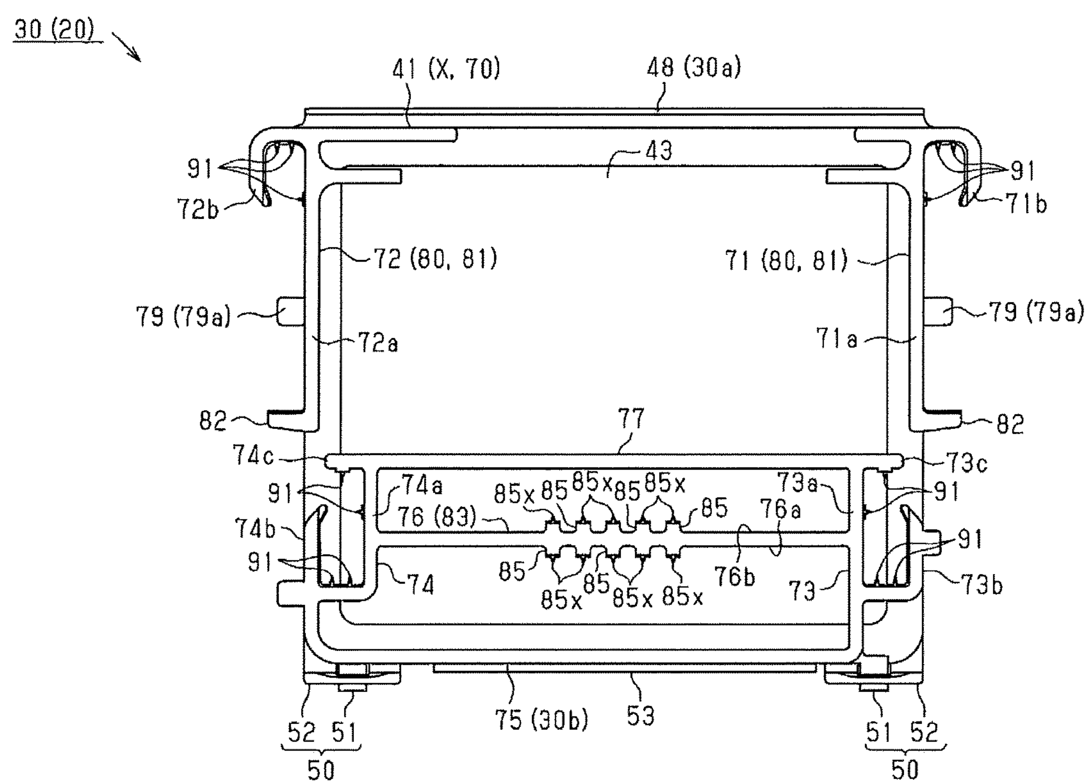
FIG. 17 is a bottom view of the accommodation case.

Further, as illustrated in FIGS. 15 to 17, the accommodation case 30 of the embodiment is provided with crushing ribs 91 having the same shape as the triangular prism portion 86 in which the crushing margin 85*x* of each of the fitting portions 85 is set, in the wall portions 71 and 72 engaged with the engagement protrusions 61 and 62 on the housing 33 side, as well as in the wall portions 73 and 74 engaged with the engagement protrusions 63 and 64 on the housing 33 side. The engagement protrusions 61 to 64 are configured to strengthen the engagement force (fitting force) as the crushing ribs 91 are crushed when the engagement protrusions 61 to 64 on the housing 33 side are engaged.

As described above, according to the embodiment, the following effects may be obtained.

(1) The steering apparatus 1 includes the steering column 3 that rotatably supports the steering shaft 2, and the controller 20 provided with the accommodation case 30 fixed to the outer peripheral surface S of the steering column 3. A pair of engagement protrusions 65 and 66 facing each other are provided on the outer peripheral surface S of the steering column 3. In addition, the insertion portion 83 (the wall portion 76) is provided in the accommodation case 30 to be inserted between the engagement protrusions 65 and 66. The insertion portion 83 is provided with the fitting portion 85 having the crushing margin 85*x* which is crushed by the engagement protrusions 65 and 66 when the insertion portion 83 is inserted between the engagement protrusions 65 and 66.

With the above-described configuration, the engagement protrusions 65 and 66 on the steering column 3 side and the fitting portion 85 provided on the insertion portion 83 on the accommodation case 30 side, which is inserted between the engagement protrusions 65 and 66, are brought into close contact with each other. Therefore, it is possible to suppress the displacement of the accommodation case 30 in a direction in which the engagement protrusions 65 and 66 face each other. In addition, it is possible to suppress the movement of the accommodation case 30 which may cause the insertion portion 83 to be pulled out from the space between the engagement protrusions 65 and 66. As a result, the accommodation case 30 of the controller 20 may be more stably fixed to the steering column 3 with a simple configuration.

(2) The fitting portion 85 is provided to extend in a direction in which the engagement protrusions 65 and 66 protrude from the outer peripheral surface S of the steering column 3 in a state where the insertion portion 83 is inserted between the engagement protrusions 65 and 66.

With the above-described configuration, the crushing margin 85*x* provided in the fitting portion 85 may be more securely crushed by inserting the insertion portion 83 on the accommodation case 30 side between the engagement protrusions 65 and 66 in the direction in which the engagement protrusions 65 and 66 protrude from the outer peripheral surface S of the steering column 3. In addition, it is possible to more effectively suppress the tilting of the accommodation case 30 when the direction in which the engagement protrusions 65 and 66 protrude is used as a reference. Therefore, the accommodation case 30 of the controller 20 may be more stably fixed to the steering column 3.

(3) The insertion portion 83 on the accommodation case 30 side is provided with plural fitting portions 85 aligned in the extending direction of the engagement protrusions 65 and 66 extending in the direction along the outer peripheral surface S of the steering shaft 3 in a state where the insertion portion 83 is inserted between the engagement protrusions 65 and 66 on the steering column 3 side.

With the above-described configuration, it is possible to more securely suppress the displacement of the accommodation case 30 in the direction in which the engagement protrusions 65 and 66 face each other, and to suppress the movement of the accommodation case 30 which may cause the insertion portion 83 to be pulled out from the space between the engagement protrusions 65 and 66. In addition, it is possible to suppress the movement of the accommodation case 30 pivoting about the pivotal axis intersecting with the outer peripheral surface S of the steering column 3. Therefore, the accommodation case 30 of the controller 20 may be more stably fixed to the steering column 3.

(4) The engagement protrusions 65 and 66 are castings integrally formed with the housing 33, which constitutes the outer peripheral surface S of the steering column 3.

That is, in the configuration in which the engagement protrusions 65 and 66 are formed by casting, the tolerance set in the gap between the engagement protrusions 65 and 66 increases. However, the fitting portion 85 may be brought into close contact with the engagement protrusions 65 and 66 by providing the fitting portion 85 having the crushing margin 85*x* in the insertion portion 83 on the accommodation case 30 side to be inserted between the engagement protrusions 65 and 66. Therefore, by applying the above-described configurations (1) to (3) to this configuration, a more remarkable effect may be obtained.

(5) The controller 20 includes the connector portion 53 exposed to the outside of the accommodation case 3. In addition, the engagement protrusions 65 and 66 are provided to face each other in a direction in which the wire harness 90 is connected to the connector portion 53.

With the above-described configuration, there is a possibility that a force for separating the accommodation case 30 from the outer circumferential surface S of the steering column 3 may occur while accompanying pivoting (tilting) of the accommodation case 30 when the connector is connected. This tendency becomes more prominent when the wire harness 90 is connected to the connector portion 53 from a direction (twist direction) not intersecting with the side surface portion 33*a* of the housing 33. However, since the fitting portion 85 in a state where the crushing margin 85*x* is crushed is brought into close contact with the engagement protrusions 65 and 66, which face each other in the direction in which the wire harness 90 is connected to the connector portion 53, it is possible to counteract the force for separating the accommodation case 30 from the outer peripheral surface S of the steering column 3 as described above. Therefore, by applying the above-described configurations (1) to (3) to this configuration, a more remarkable effect may be obtained.

(6) The slit 54 is provided in the side end portion 30*b* of the accommodation case 30 to pull out the connector portion 53 to the outside of the accommodation case 30. The wall portion 76 serving as the insertion portion 83 on the accommodation case 30 side to be inserted between the engagement protrusions 65 and 66 on the steering column 3 side is provided substantially in parallel with the wall portion 75 in the vicinity of the wall portion 75 extending along the second side end portion 30*b* of the accommodation case 30.

With the above-described configuration, the engagement protrusions 65 and 66 on the steering column 3 side and the insertion portion 83 on the accommodation case 30 side are disposed between the outer peripheral surface S of the steering column 3 and the connector portion 53. Therefore, it is possible to more effectively counteract the force for separating the accommodation case 30 from the outer peripheral surface S of the steering column 3 when connecting the connector. As a result, the accommodation case 30 of the controller 20 may be more stably fixed to the steering column 3.

(7) The accommodation case 30 includes the pedestal portion X fitted to the outer peripheral surface S of the steering column 3. Therefore, it is possible to facilitate the fixing operation of the accommodation case 30 to the outer peripheral surface S of the steering column 3. By applying the above-described configurations (1) to (3) to this configuration, a more remarkable effect may be obtained.

(8) The pedestal portion X includes plural engagement pieces 80 having flexibility. Each of the engagement pieces 80 forms the snap fit 81 that fixes the accommodation case 30 in a non-detachable manner with respect to the outer peripheral surface S of the steering column 3. In addition, the engagement protrusions 65 and 66 are provided to face each other in the direction intersecting with the direction connecting the snap fits 81.

With the above-described configuration, the pivot fulcrum P of the accommodation case 30 is easily formed in a manner of connecting the snap fits 81. However, since the fitting portion 85 in a state where the crushing margin 85*x* is crushed is brought into close contact with the engagement protrusions 65 and 66, which face each other in the direction intersecting with the direction connecting the snap fits 81, it is possible to counteract the force for pivoting the accommodation case 30 as described above. Therefore, the accommodation case 30 of the controller 20 may be more stably fixed to the steering column 3.

(9) The insertion portion 83 on the accommodation case 30 side is constituted by the plate-shaped wall portion 76 extending along the extending direction of the engagement protrusions 65 and 66 extending in the direction along the outer peripheral surface S of the steering column 3. That is, since the plate-like insertion portion 83 inserted between the engagement protrusions 65 and 66 abuts onto the outer peripheral surface S of the steering column 3 in a state of following the engagement protrusions 65 and 66 (see FIG. 25), it is possible to suppress the tilting of the accommodation case 30 in the extending direction of the engaging protrusions 65 and 66. Therefore, the accommodation case 30 of the controller 20 may be more stably fixed to the steering column 3.

(10) The engagement protrusions 65 and 66 are provided to extend in the axial direction of the steering shaft 2. By adopting this configuration, the engagement protrusions 65 and 66 may extend longer along the outer peripheral surface S of the steering column 3. Further, it is possible to provide more fitting portions 85 to the insertion portion 83 on the accommodation case 30 side. Therefore, the accommodation case 30 of the controller 20 may be more stably fixed to the steering column 3.

The above embodiment may be modified as follows.

- In the above embodiment, the accommodation case 30 is formed in a substantially rectangular flat box shape, but the shape thereof may be arbitrarily changed.
- In the above embodiment, the housing 33 that holds the support tube 5 and the steering shaft 2 in its interior space in a semi-cylindrical shape having a substantially U-shaped cross-section constitutes the outer peripheral surface S of the steering column 3. However, this disclosure is not limited thereto, but may be applied to, for example, a configuration in which the support tube 5 (outer tube) functions as a housing, which constitutes the outer peripheral surface S of the steering column 3.
- In the above embodiment, the engagement protrusions 79 of the engagement pieces 80 provided on the pedestal portion X of the accommodation case 30 are engaged with the holes 78 provided in the engagement protrusions 61 and 62 on the steering column 3 side to form the snap fits 81 which fix the accommodation case 30 in a non-detachable manner with respect to the outer peripheral surface S of the steering column 3. However, this disclosure is not limited thereto, and the configuration of the snap fits 81 may be arbitrarily changed, for example, so as to provide holes in the engagement pieces 80 on the accommodation case 30 side or to provide engagement protrusions engaging with the holes on the steering column 3 side. Further, such a snap fit 81 may not be provided.
- In the above embodiment, the wire harness 90 is connected to the connector portion 53 from the lower side of the steering column 3. However, the connection direction of the wire harness 90 with respect to the connector portion 53 may be arbitrarily changed.

In the above embodiment, the engagement protrusions 65 and 66 on the steering column 3 side in which the wall portion 76 serving as the insertion portion 83 on the accommodation case 30 side is inserted into the gap therebetween, are provided to extend in the axial direction of the steering shaft 2, but the extending direction thereof may be arbitrarily changed. For example, in a case where the direction in which the wire harness 90 is connected to the connector portion 53 to which a force for separating the accommodation case 30 from the outer peripheral surface S of the steering column 3 is likely to be applied, or the direction of connecting the snap fits 81, is different from the axial direction (or intersecting direction) of the steering shaft 2, the extending direction of the engagement protrusions 65 and 66 may be set correspondingly.

Further, plural engagement protrusion pairs which extend in different directions and in which the insertion portions 83 on the accommodation case 30 side are inserted into the gaps therebetween, may be provided. Therefore, it is possible to strengthen the fitting force of the accommodation case 30 to the outer peripheral surface S of the steering column 3.

In the above embodiment, a pair of engagement protrusions 61 and 62, which face each other at two positions spaced apart from each other in the axial direction of the steering shaft 2, and a pair of engagement protrusions 63 and 64, which face each other at two positions spaced apart from each other in the axial direction of the steering shaft 2, are provided. In addition, the pedestal portion X of the accommodation case 30 is provided with the wall portions 71 to 74 engaged with the engagement protrusions 61 to 64. However, this disclosure is not limited thereto, and the configuration in which the pedestal portion X of the accommodation case 30 is fitted to the outer peripheral surface S of the steering column 3 may be arbitrarily changed.

Further, this disclosure may be applied to a configuration in which a fastening structure using bolts or the like is used in combination. Even with this configuration, it is possible to facilitate the simplification of the configuration by, for example, reducing the number of fastening points.

In the above embodiment, the engagement protrusions 65 and 66 on the steering column 3 side have a substantially flat outer shape, and the insertion portion 83 on the accommodation case 30 side to be inserted between the engagement protrusions 65 and 66 is the wall portion 76 having a plate shape along the extending direction of the engagement protrusions 65 and 66. However, this disclosure is not limited thereto, and the shapes of the engagement protrusions 65 and 66 and the insertion portion 83 may be arbitrarily changed as long as it is possible to secure the structure in which the fitting portions 85 in a state where the crushing margin 85*x* is crushed are in close contact with the engagement protrusions 65, 66. The shape of the fitting portion 85 including the crushing margin 85*x* may also be arbitrarily changed.

Next, technical ideas that may be grasped from the above embodiment will be described together with the effects.

A steering apparatus according to an aspect of this disclosure includes a steering column that rotatably supports a steering shaft, and a controller provided with an accommodation case fixed to an outer peripheral surface of the steering column. A pair of engagement protrusions, which face each other, are provided on the outer peripheral surface of the steering column, an insertion portion is provided in the accommodation case to be inserted between the engagement protrusions, and the insertion portion is provided with a fitting portion having a crushing margin which is crushed by the engagement protrusions when the insertion portion is inserted between the engagement protrusions.

According to this configuration, the engagement protrusions on the steering column side and the fitting portion provided on the insertion portion on the accommodation case side inserted between the engagement protrusions are brought into close contact with each other. Therefore, it is possible to suppress the displacement of the accommodation case in a direction in which the engagement protrusions face each other. In addition, it is possible to suppress the movement of the accommodation case which may cause the insertion portion to be pulled out from the space between the engagement protrusions. As a result, the accommodation case of the controller may be more stably fixed to the steering column with a simple configuration.

In the steering apparatus, it is preferable that the fitting portion extends in a direction in which the engagement protrusions protrude from the outer peripheral surface of the steering column in a state where the insertion portion is inserted between the engagement protrusions.

According to this configuration, the crushing margin provided in the fitting portion may be more securely crushed by inserting the insertion portion on the accommodation case side between the engagement protrusions in the direction in which the engagement protrusions protrude from the outer peripheral surface of the steering column. In addition, it is possible to more effectively suppress the tilting of the accommodation case when the direction in which the engagement protrusions protrude is used as a reference. Therefore, the accommodation case of the controller may be more stably fixed to the steering column.

In the steering apparatus, it is preferable that the insertion portion is provided with a plurality of the fitting portions aligned in an extending direction of the engagement protrusions which extend in a direction along the outer peripheral surface of the steering column in a state where the insertion portion is inserted between the engagement protrusions.

According to this configuration, it is possible to more securely suppress the displacement of the accommodation case in the direction in which the engagement protrusions face each other, and to suppress the movement of the accommodation case which may cause the insertion portion to be pulled out from the space between the engagement protrusions. In addition, it is possible to suppress the movement of the accommodation case pivoting about the pivotal axis intersecting with the outer peripheral surface of the steering column. Therefore, the accommodation case of the controller may be more stably fixed to the steering column.

In the steering apparatus, it is preferable that the engagement protrusions are castings integrally formed with a housing, which constitutes the outer peripheral surface of the steering column.

That is, in the configuration in which the engagement protrusions are formed by casting, the tolerance set in the gap between the engagement protrusions increases. However, the fitting portion may be brought into close contact with the engagement protrusions by providing a fitting portion having a crushing margin in the insertion portion on the accommodation case side to be inserted between the engagement protrusions. Therefore, by applying each of the above-described configurations to this configuration, a more remarkable effect may be obtained.

In the steering apparatus, it is preferable that the controller includes a connector portion exposed to an outside of the accommodation case, and the engagement protrusions are provided to face each other in a direction in which a wire harness is connected to the connector portion.

According to this configuration, there is a possibility that a force for separating the accommodation case from the outer circumferential surface of the steering column may occur while accompanying pivoting (tilting) of the accommodation case when the connector is connected. However, since the fitting portion in a state where the crushing margin is crushed is brought into close contact with the engagement protrusions facing each other in the direction in which the wire harness is connected to the connector portion, it is possible to counteract the force for separating the accommodation case from the outer peripheral surface of the steering column as described above. Therefore, by applying each of the configurations of providing a fitting portion having a crushing margin as described above to this configuration, a more remarkable effect may be obtained.

In the steering apparatus, it is preferable that the engagement protrusions and the insertion portion are positioned between the outer peripheral surface of the steering column and the connector portion.

According to this configuration, it is possible to more effectively counteract the force for separating the accommodation case from the outer peripheral surface of the steering column when the connector is connected. Therefore, the accommodation case of the controller may be more stably fixed to the steering column.

In the steering apparatus, it is preferable that the accommodation case includes a pedestal portion fitted to the outer peripheral surface of the steering column.

According to this configuration, it is possible to facilitate the fixing operation of the accommodation case to the outer peripheral surface of the steering column. In addition, by applying each of the configurations of providing a fitting portion having a crushing margin as described above to this configuration, a more remarkable effect may be obtained.

In the steering apparatus, it is preferable that the pedestal portion includes a plurality of engagement pieces having flexibility, and each of the engagement pieces forms a snap fit that fixes the accommodation case in a non-detachable manner with respect to the outer peripheral surface of the steering column, and the engagement protrusions are provided to face each other in a direction intersecting with a direction connecting the snap fits.

According to this configuration, the pivot fulcrum of the accommodation case is easily formed in a manner of connecting the snap fits. However, since the fitting portion in a state where the crushing margin is crushed is brought into close contact with the engagement protrusions facing each other in the direction intersecting with the direction connecting the snap fits, it is possible to counteract the force for pivoting the accommodation case as described above. Therefore, the accommodation case of the controller may be more stably fixed to the steering column.

In the steering apparatus it is preferable that the insertion portion has a plate shape along the extending direction of the engagement protrusions extending along the outer circumferential surface of the steering column.

According to this configuration, it is possible to suppress the tilting of the accommodation case in the extending direction of the engagement protrusions by causing the insertion portion on the accommodation case side to abut onto the outer peripheral surface of the steering column. Therefore, the accommodation case of the controller may be more stably fixed to the steering column.

In the steering apparatus, it is preferable that the engagement protrusions are provided to extend in the axial direction of the steering shaft.

According to this configuration, the engagement protrusions may extend longer along the outer peripheral surface of the steering column. Therefore, the accommodation case of the controller may be more stably fixed to the steering column.

According to the aspect of this disclosure, the accommodation case of the controller may be more stably fixed to the steering column with a simple configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering apparatus comprising:

a steering column that rotatably supports a steering shaft; and a controller provided with an accommodation case fixed to an outer peripheral surface of the steering column, wherein a pair of engagement protrusions, which face each other, are provided on the outer peripheral surface of the steering column, an insertion portion is provided in the accommodation case to be inserted between the engagement protrusions, and the insertion portion is provided with a fitting portion having a crushing margin which is crushed by the engagement protrusions when the insertion portion is inserted between the engagement protrusions.

2. The steering apparatus according to claim 1, wherein the fitting portion extends in a direction in which the engagement protrusions protrude from the outer peripheral surface of the steering column in a state where the insertion portion is inserted between the engagement protrusions.

3. The steering apparatus according to claim 1, wherein the insertion portion is provided with a plurality of the fitting portions aligned in an extending direction of the engagement protrusions which extend in a direction along the outer peripheral surface of the steering column in a state where the insertion portion is inserted between the engagement protrusions.

4. The steering apparatus according to claim 2, wherein the insertion portion is provided with a plurality of the fitting portions aligned in an extending direction of the engagement protrusions which extend in a direction along the outer peripheral surface of the steering column in a state where the insertion portion is inserted between the engagement protrusions.

5. The steering apparatus according to claim 1, wherein the engagement protrusions are castings integrally formed with a housing, which constitutes the outer peripheral surface of the steering column.

6. The steering apparatus according to claim 2, wherein the engagement protrusions are castings integrally formed with a housing, which constitutes the outer peripheral surface of the steering column.

7. The steering apparatus according to claim 3, wherein the engagement protrusions are castings integrally formed with a housing, which constitutes the outer peripheral surface of the steering column.

8. The steering apparatus according to claim 1, wherein the controller includes a connector portion exposed to an outside of the accommodation case, and the engagement protrusions are provided to face each other in a direction in which a wire harness is connected to the connector portion.

9. The steering apparatus according to claim 2, wherein the controller includes a connector portion exposed to an outside of the accommodation case, and the engagement protrusions are provided to face each other in a direction in which a wire harness is connected to the connector portion.

10. The steering apparatus according to claim 3, wherein the controller includes a connector portion exposed to an outside of the accommodation case, and the engagement protrusions are provided to face each other in a direction in which a wire harness is connected to the connector portion.

11. The steering apparatus according to claim 5, wherein the controller includes a connector portion exposed to an outside of the accommodation case, and the engagement protrusions are provided to face each other in a direction in which a wire harness is connected to the connector portion.

12. The steering apparatus according to claim 8, wherein the engagement protrusions and the insertion portion are positioned between the outer peripheral surface of the steering column and the connector portion.

13. The steering apparatus according to claim 1, wherein the accommodation case includes a pedestal portion fitted to the outer peripheral surface of the steering column.

14. The steering apparatus according to claim 2, wherein the accommodation case includes a pedestal portion fitted to the outer peripheral surface of the steering column.

15. The steering apparatus according to claim 3, wherein the accommodation case includes a pedestal portion fitted to the outer peripheral surface of the steering column.

16. The steering apparatus according to claim 5, wherein the accommodation case includes a pedestal portion fitted to the outer peripheral surface of the steering column.

17. The steering apparatus according to claim 8, wherein the accommodation case includes a pedestal portion fitted to the outer peripheral surface of the steering column.

18. The steering apparatus according to claim 12, wherein the accommodation case includes a pedestal portion fitted to the outer peripheral surface of the steering column.

19. The steering apparatus according to claim 13, wherein the pedestal portion includes a plurality of engagement pieces having flexibility, and each of the engagement pieces forms a snap fit that fixes the accommodation case in a non-detachable manner with respect to the outer peripheral surface of the steering column, and the engagement protrusions are provided to face each other in a direction intersecting with a direction connecting the snap fits.

* * * * *